United States Patent [19]
Brown

[11] 4,198,472
[45] Apr. 15, 1980

[54] SURFACE FINISHES FOR RIGID STRUCTURES

[75] Inventor: Alvin Brown, Redding, Calif.

[73] Assignee: Kinbrace Pty. Ltd., New South Wales, Australia

[21] Appl. No.: 878,806

[22] Filed: Feb. 17, 1978

[51] Int. Cl.² ............... B05D 3/00; B05D 3/12; B32B 9/04
[52] U.S. Cl. ............... 428/538; 106/89; 106/90; 106/97; 106/98; 52/515; 427/353; 427/356; 428/539
[58] Field of Search ............... 427/353, 356; 428/538, 428/539; 106/89, 90, 97, 98; 52/515

[56] References Cited

U.S. PATENT DOCUMENTS

| | | | |
|---|---|---|---|
| 2,517,993 | 8/1950 | Falco | 106/97 X |
| 3,021,291 | 2/1962 | Thiessen | 106/97 X |
| 3,854,985 | 12/1974 | Suzuki et al. | 106/97 X |
| 3,870,553 | 3/1975 | Hussey | 106/97 X |

OTHER PUBLICATIONS

The Chemistry of Cement & Concrete, 1956, p. 506.

*Primary Examiner*—Michael R. Lusignan
*Attorney, Agent, or Firm*—Fulwider, Patton, Rieber, Lee & Utecht

[57] ABSTRACT

An exposed aggregate surface is applied to a reinforced concrete swimming pool or similar structure by pumping through a discharge nozzle a mix which is deposited as a relatively thin layer which is then worked by trowelling to compact the aggregate and draw portland cement in the mix to the surface of the coating and a fine water spray is used to wash away the excess cement. The mix comprises fine aggregate substantially smaller in size than aggregate which will pass through a ½ inch mesh, a rich cement to aggregate ratio for example 1:1 by volume, the aggregate being substantially free of fines and a quantity of water such that a small slump is provided.

11 Claims, 2 Drawing Figures

SURFACE FINISHES FOR RIGID STRUCTURES

FIELD OF THE INVENTION

The present invention relates to surface treatments for rigid structures and may be especially applicable although not limited to structures such as swimming pools of reinforced concrete and other rigid structures requiring the application of a durable surface finish to a relatively large area.

More particularly the present invention is concerned with a surface finish being of the type known as an "exposed aggregate," which usually comprises relatively small solid particles such as selected gravel bound together and to the substrate by a suitable cement binder.

One known manner of forming an exposed aggregate surface finish for a concrete structure such as a path or swimming pool is to allow the concrete structure to cure and subsequently to apply cement in the form of an epoxy adhesive to the substrate and to trowel on the aggregate. The aggregate may be fine particles of gravel, for example coloured river gravel having a size of the order of one-eighth inch diameter.

PRIOR ART

Another known method is to pour the concrete structure and before the concrete hardens to apply a thin layer of aggregate to the surface of the concrete by a seeding technique. The gravel is then worked with a trowel so as to become partially embedded in the concrete. This technique permits a far more durable and permanent finish which is highly resistant to light, water, and the pressure of foot or vehicle traffic. By contrast an epoxy-aggregate system has more limited binding power of the aggregate and the epoxy resin may degrade after a substantial period of exposure to strong sunlight whereby the aggregate may become detached.

It is also possible to provide an exposed aggregate finish by using a portland type cement and aggregate mixture applied as a surface layer to a concrete substrate, the excess cement being removed by a washing technique to leave partially exposed a multiplicity of particles of aggregate. However, this system, which can include use of a chemical retarding agent to delay curing of the cement near the surface, is highly time consuming and requires great patience and the use of skilled operatives. Accordingly this method is expensive and a small team can only complete a small area in one day. Thus, a large job requires joints between separate sections.

SUMMARY OF THE INVENTION

The present invention, broadly speaking, is concerned in one aspect with a method of applying a surface coating which includes a selected aggregate, particles of which are to be exposed to provide the desired surface finish, the method comprising forming a mix comprising selected aggregate and portland-type cement, the mix being richer in cement than the ratio of three parts by volume aggregate to one part by volume of cement, adding water in a controlled quantity whereby the batch has a slump which is small compared with a slump of six inches, the aggregate being an aggregate which will pass through a mesh substantially smaller than a half inch mesh and the mix containing substantially no fines, supplying the mix to a pumping apparatus and operating the pump to discharge the mix through a discharge nozzle to deposit a layer on a rigid substrate such as concrete, applying localized pressure progressively over the surface of the coating layer for the purpose of working the deposited mix to pack the aggregate particles together and tending to draw the portland cement to the surface of the layer, and applying a fine water spray to wash away excess portland cement.

Preferably the method of the invention is additionally characterized by one or more of the following features:

(1) The aggregate will pass through a mesh of about one-eighth inch, the particles being approximately uniform in size and for example being washed river gravel of a rounded form and of selected colours.

(2) The mix is very rich in cement, for example of the order of 1:1 by volume.

(3) The slump of the mix is very small, for example of the order of one inch using a standard slump test, the slump being preferably particularly small where a vertical surface is to be coated with the exposed aggregate finish.

(4) The pumping apparatus may be a conventional mortar or plaster pumping apparatus suitably adapted if necessary, the apparatus being for example of the type used to spray plaster ceilings in buildings.

(5) Calcium stearate is used in the mix to improve the workability thereof.

The invention in another aspect extends to a structure such as a concrete swimming pool having a surface coating thereon formed according to the method in any one of the above described forms. However, the invention may also be applied to the provision of an exposed aggregate finish on other large surface areas such as walkways, driveways and even vertical facings on buildings.

The present invention may have many advantages which will be more particularly described with reference to the application of the invention to a surface coating for swimming pools.

Although an exposed aggregate finish could be applied to the interior of reinforced concrete swimming pools by known methods, this is very rare and is partially due to the high cost of conventional techniques compared with alternative surface finishes but also due to the problem of coating the large surface areas; generally several days work for a typical group of tradesmen would be required thereby necessitating the provision of many joints which would be undesirable.

Use of the invention in at least a preferred embodiment can permit the following principal advantages to be obtained:

(1) The exposed aggregate finish can be applied on the same day as the concrete swimming pool is poured. Normally formwork is erected to define the exterior of the swimming pool or alternatively the walls of the hole in the ground are utilized; the reinforcing steel is placed in position and the concrete pumped to buildup the wall around the swimming pool progressively, the slump of the concrete being relatively low so that hand trowelling can continually occur on the interior of the swimming pool to provide a smooth surface finish. As soon as this operation has been completed, the exposed aggregate mix can be pumped and trowelled into position.

(2) In general the public authorities insist on inspections including that of safety fences before a swimming pool is filled. An exposed aggregate finish applied according to an embodiment of the invention can safely be left exposed to the air after application and the swimming pool can be filled at any desired later date. By contrast a common surface finish of the interior of a swimming pool is a powdered marble finish bound in a plaster which is hand trowelled into position by a skilled tradesman. As soon as this operation is finished the swimming pool must be filled to keep the plaster wet during the critical and slow curing process. Otherwise excess shrinking of the plaster will occur thereby leaving unsightly cracks in the plaster finish. If desired however, swimming pools having an interior finish applied by a method embodying the invention could be filled as soon as surface hardening of the aggregate has occurred although it would in general be desirable to leave filling the swimming pool for a period of time such as seven days to permit the reinforced concrete component to gain structural strength.

(3) Where the exposed aggregate is applied immediately after surface hardening of the reinforced concrete has occurred, due to the very rich nature of the surface coating, faster curing occurs in this surface coating and this in itself provides a barrier which effectively retards what would otherwise be a tendency for the reinforced concrete to cure too quickly and perhaps crack, this danger being especially great in hot and sunny weather. Thus, the exposed aggregate can obviate the conventional practice of keeping a newly poured reinforced concrete structure damp for a period of approximately one week.

(4) The present invention in preferred embodiments lends itself to efficient, fast and effective methods of coating concrete requiring only small amounts of labour yet permitting a durable and permanent finish to be provided. An efficient pump may be employed to apply quickly and accurately the desirable coating layer and after the hand trowelling operation a wide fine water spray head may be employed to wash down gently but efficiently remove excess cement.

(5) Another advantage is that exposed aggregate can have a substantial heating effect on the temperature of the water by causing heat from the sun to be absorbed; by contrast commonly adopted plaster-type finishes are highly reflectant of the heat from the sun's rays and the expense of a solar heater for raising the temperature can be obviated.

(6) The exposed aggregate finish can obviate staining and discolouration which can occur with popular finishes for swimming pools. Furthermore the problems that can be associated with tiled swimming pools can be avoided in that there is no possibility of loosening of tiles.

BRIEF DESCRIPTION OF THE DRAWINGS

For illustrative purposes only, the invention will be exemplified with reference to a preferred embodiment described hereinafter with reference to the accompanying drawings of which.

DETAILED DESCRIPTION OF EMBODIMENTS OF INVENTION

Figure 1:
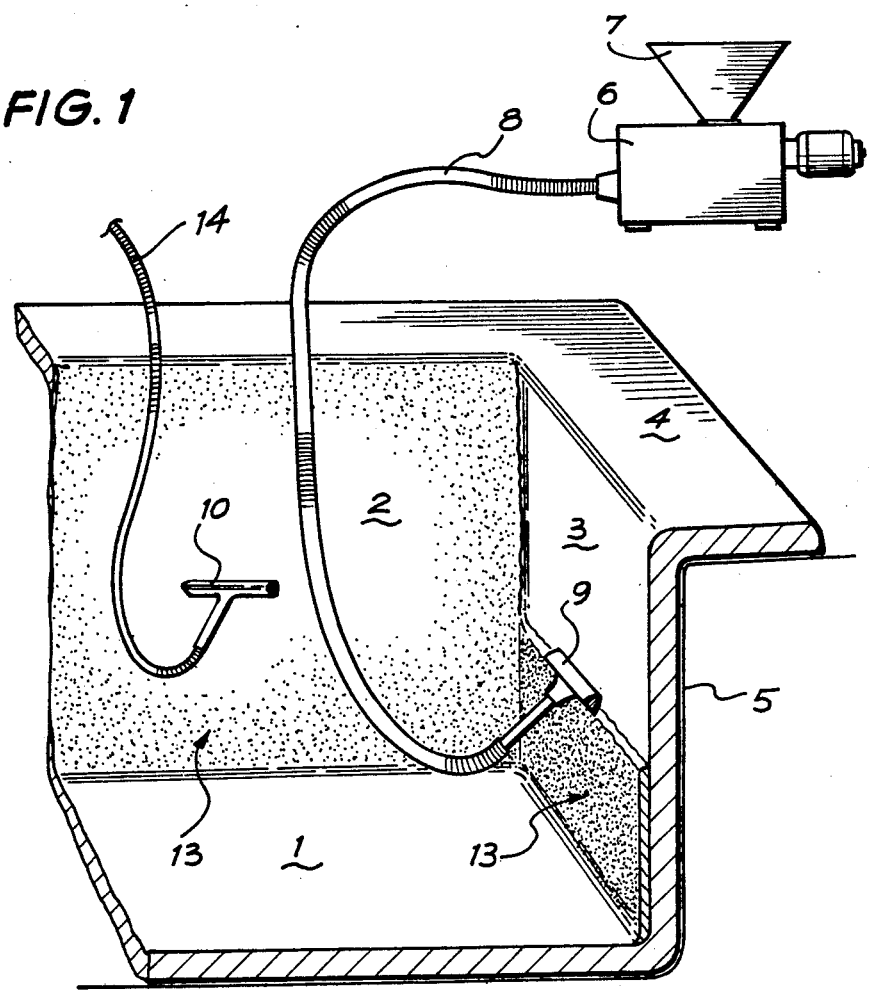
FIG. 1 illustrates schematically the interior of a swimming pool being surface coated according to an embodiment of the invention.

As illustrated in FIG. 1, the swimming pool comprises a floor 1, an end wall 2 and a side wall 3 of reinforced concrete, a peripheral deck 4 being integrally formed therewith. The swimming pool in this embodiment is formed in an excavated hole in the ground having walls 5, the profile of which acts as formwork for the concrete. Although only shown in FIG. 2, reinforcing steel 11 is positioned in the wall area and the appropriate mix 12 placed and trowelled in position to form the walls and deck.

FIG. 1 illustrates the formation of an exposed aggregate coating layer 13 on the interior of the swimming pool, end wall 2 and part of side wall 3 having the coating thereon.

The surface coating 13 is supplied by a pump 6 (schematically shown) having a hopper 7 into which the appropriate batch from a mixer is applied, the pump passing the mixture through a conduit 8 of approximately two inches diameter to a wide spraying or dispensing head 9 which is controlled by hand by an operator. The thin surface coating is built up over the wall surface and when the cement in the mixture starts to harden, an operator works the surface coating with a trowel and as the setting action starts to occur a very fine water spray is applied from a spray head 10 which is connected to a water hose 14 to remove the excess cement.

Figure 2:
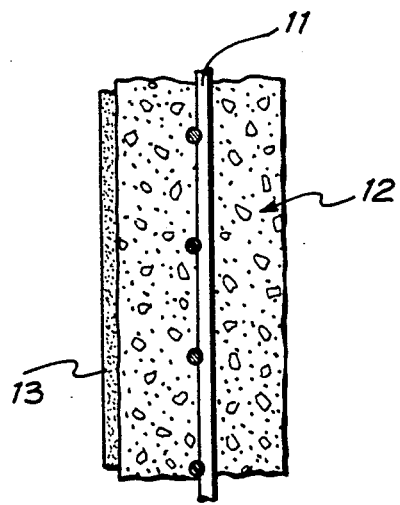
FIG. 2 is a cross-sectional view on enlarged scale through the wall of the swimming pool having surface coating on the interior thereof.

FIG. 2 illustrates a typical wall cross-section and shows reinforcing steel 11 in the centre of a reinforced concrete wall 12 typically of four inches thickness and having a thin layer 13 typically quarter inch thick on the interior side, this layer 13 comprising exposed aggregate which preferably is formulated as follows:

Aggregate: One-eighth inch diameter washed rounded river gravel free of fines
Mixture: Portland cement one part by volume to aggregate one part by volume
Slump: One inch slump.
Additive: Calcium stearate.

A swimming pool may be efficiently built if desired in a very short period of time such as one working day. A typical procedure would be as follows:

(a) Using suitable digging equipment such as a backhoe and/or bulldozer, a hole is dug in the ground. This may take approximately four hours.

(b) Reinforcing steel is placed in position around the pool, desirably using preprepared panels of welded mesh.

(c) Concrete of appropriate formulation is pumped to form the walls, the walls of the hole acting as formwork and the interior surfaces of the walls being trowelled by hand.

(d) The exposed aggregate treatment is applied by pumping the appropriate mixture and trowelling into position for example by using an ESSEX brand plaster pump. Water washing is conducted as the setting takes place, a pump being utilized to remove the water and cement slurry which collects at the deep end of the swimming pool.

(e) After drying and surface hardening, a dilute hydrochloric acid washdown is conducted to removed excess cement.

(f) After erection of any necessary ancillary equipment such as safety fencing, the swimming pool may be filled.

What is claimed is:

1. A method of applying an exposed aggregate surface coating to a rigid structure, the method comprising:

(a) forming a mix of aggregate particles substantially free of fines and portland-type cement, the mix being:
  (i) of a richer cement to aggregate ratio by volume than the ratio 1:3,
  (ii) having a quantity of water controlled to provide a slump which is less than six inches, and
  (iii) formed with aggregate particles free of fines, of substantially uniform size with diameters no less than about ⅛ inch and all substantially less than ½ inch, to permit pumping of said mix;
(b) pumping the mix through a pumping apparatus to a discharge nozzle to be displaced over and adjacent the rigid structure to deposit a layer thereon;
(c) applying localized pressure progressively over the surface of the deposited layer for packing the aggregate particles into said layer; and
(d) applying a fine water spray to wash away excess portland cement.

2. A method according to claim 1 wherein the aggregate particles have a diameter of approximately one-eighth inch and are rounded gravel of uniform size and free of fines.

3. A method according to claim 1, wherein the ratio of cement to aggregate in said mix is approximately 1:1 by volume.

4. A method according to claim 3, wherein the slump of said mix is approximately one inch.

5. A method according to claim 1, wherein said pumping apparatus is a conventional plaster pumping apparatus.

6. A method according to claim 3, wherein said mix further includes calcium stearate.

7. A method according to claim 1, wherein the localized pressure is applied to the layer manually with a trowel and at least one additional trowelling step is applied after said water spray step to further compact the aggregate particles and draw out cement, a final water spray step occurring after the final trowelling step.

8. A reinforced concrete structure having a surface coating applied thereto, the surface coating comprising a mix of aggregate and portland-type cement, particles near the surface of the coating layer being partially exposed and the coating layer having been formed from a mix comprising aggregate with particle sizes no less than about ⅛ inch diameter and all passing through a screen having a mesh of one-half inch, and portland-type cement in a ratio of approximately 1:1 by volume, the mix being substantially free of fines and having a slump of the order of 1 inch, to permit pumping said mix, the coating layer having been compacted progressively by localized pressure followed by washing with a fine water spray to remove excess cement found at the surface of the layer after the application of localized pressure.

9. A swimming pool of reinforced concrete having at least the interior surface thereof coated with an exposed aggregate coating layer according to the method of claim 1.

10. A method according to claim 7 wherein said layer is troweled to a thickness of about ¼ inch.

11. The reinforced concrete structure of claim 8 wherein said surface coating has a thickness of about ¼ inch.

* * * * *